United States Patent
Lee et al.

(10) Patent No.: US 10,056,190 B2
(45) Date of Patent: Aug. 21, 2018

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si, Gyeonggi-do (KR)

(72) Inventors: Seung Heui Lee, Suwon-si (KR); Seung Ho Lee, Suwon-si (KR); Kyoung Jin Cha, Suwon-si (KR); Min Gon Lee, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 98 days.

(21) Appl. No.: 15/217,194

(22) Filed: Jul. 22, 2016

(65) Prior Publication Data
US 2017/0186542 A1    Jun. 29, 2017

(30) Foreign Application Priority Data

Dec. 28, 2015  (KR) .................. 10-2015-0187516

(51) Int. Cl.

| | |
|---|---|
| *H01G 4/30* | (2006.01) |
| *H01G 4/12* | (2006.01) |
| *H01G 4/232* | (2006.01) |
| *H01G 4/012* | (2006.01) |
| *H01G 4/008* | (2006.01) |

(52) U.S. Cl.
CPC .............. *H01G 4/30* (2013.01); *H01G 4/008* (2013.01); *H01G 4/012* (2013.01); *H01G 4/1227* (2013.01); *H01G 4/232* (2013.01)

(58) Field of Classification Search
CPC ........ H01G 4/008; H01G 4/232; H01G 4/012; H01G 4/1227; H01G 4/30
See application file for complete search history.

(56) References Cited

U.S. PATENT DOCUMENTS

| | | | | |
|---|---|---|---|---|
| 5,046,236 A | * | 9/1991 | Wada ................. | H01C 7/102 29/25.42 |
| 2013/0049532 A1 | * | 2/2013 | Kim .................. | H01G 4/30 310/311 |
| 2013/0321977 A1 | * | 12/2013 | Lee .................. | H01G 4/008 361/301.4 |

(Continued)

FOREIGN PATENT DOCUMENTS

| | | |
|---|---|---|
| JP | 2004-079994 A | 3/2004 |
| JP | 2008-053488 A | 3/2008 |

(Continued)

*Primary Examiner* — David M Sinclair
(74) *Attorney, Agent, or Firm* — McDermott Will & Emery LLP (57) ABSTRACT

A multilayer ceramic electronic component and a method of manufacturing the same are provided. The multilayer ceramic electronic component includes a ceramic body including dielectric layers, and internal electrodes alternately disposed on the dielectric layers and containing a ceramic additive disposed therein; and external electrodes formed on an outer portion of the ceramic body and electrically connected to the internal electrodes. The ceramic additive is disposed in the internal electrode at a position spaced apart from a boundary between the internal electrode and the dielectric layer by a predetermined distance.

14 Claims, 3 Drawing Sheets

(56) References Cited

U.S. PATENT DOCUMENTS

2014/0126111 A1* 5/2014 Kim .................. H01G 4/012
361/321.2
2014/0240898 A1* 8/2014 Kim .................. H01G 4/30
361/303

FOREIGN PATENT DOCUMENTS

JP          2010-103198 A      5/2010
JP           2010103198 A  *   5/2010

* cited by examiner

FIG. 4

MULTILAYER CERAMIC ELECTRONIC COMPONENT AND METHOD OF MANUFACTURING THE SAME

CROSS-REFERENCE TO RELATED APPLICATION

This application claims benefit of priority to Korean Patent Application No. 10-2015-0187516, filed on Dec. 28, 2015 with the Korean Intellectual Property Office, the disclosure of which is incorporated herein by reference.

TECHNICAL FIELD

The present disclosure relates to a multilayer ceramic electronic component and a method of manufacturing the same, and more particularly, to a multilayer ceramic electronic component having excellent reliability, and a method of manufacturing the same.

BACKGROUND

In general, electronic components using a ceramic material, such as a capacitor, an inductor, a piezoelectric element, a varistor, a thermistor, or the like, include a ceramic body formed of ceramic material, internal electrodes formed in the ceramic body, and external electrodes disposed on a surface of the ceramic body so as to be connected to the internal electrodes.

Among ceramic electronic components, a multilayer ceramic capacitor includes a plurality of stacked dielectric layers, internal electrodes disposed to face each other with one of the dielectric layers interposed therebetween, and external electrodes electrically connected to the internal electrodes.

Multilayer ceramic capacitors have been widely used as components for mobile communications devices such as computers, a personal data assistants (PDAs), mobile phones, or the like, due to advantages such as compact size, high capacitance, ease of mountability, or the like.

Recently, in accordance with the trend toward high performance and slimness and lightness in electronic device industries, compact sized, high performance, and inexpensive electronic components have been required.

In particular, as a speed of a central processing unit (CPU) has increased and a device has been miniaturized, lightened, digitalized, and highly functionalized, research into a technology of implementing characteristics such as miniaturization, thinness, high capacitance, low impedance at a high frequency area, or the like, of the multilayer ceramic capacitor has been actively conducted.

Meanwhile, as a dielectric layer has been thinned, it is essential to use a fine material for an internal electrode. However, as a size of the material has decreased, sintering shrinkage suppressing capability may be decreased, and thus electrode connectivity after sintering may be deteriorated.

Further, since an excessive amount of an organic material is required for dispersing of the fine material, a filling rate of an inorganic material may be decreased, which causes deterioration of electrode connectivity after sintering and an increase of residual carbon.

Therefore, a method of improving withstand voltage characteristics while increasing electrode connectivity has been required.

SUMMARY

An aspect of the present disclosure may provide a multilayer ceramic electronic component and a method of manufacturing the same, and more particularly, a multilayer ceramic electronic component having excellent reliability, and a method of manufacturing the same.

According to an aspect of the present disclosure, a multilayer ceramic electronic component may include: a ceramic body including dielectric layers, and internal electrodes alternately disposed on the dielectric layers and containing a ceramic additive disposed therein; and external electrodes formed on an outer portion of the ceramic body and electrically connected to the internal electrodes. The ceramic additive is disposed in the internal electrode at a position spaced apart from a boundary between the internal electrode and the dielectric layer by a predetermined distance.

According to another aspect of the present disclosure, a method of manufacturing a multilayer ceramic electronic component may include: preparing a ceramic green sheet, forming, on the ceramic green sheet, an internal electrode pattern using a conductive paste containing a conductive metal and a ceramic additive, stacking additional ceramic green sheets on each of which an additional internal electrode pattern is formed to form a ceramic multilayer body, and sintering the ceramic multilayer body to form a ceramic body including dielectric layers and internal electrodes. The conductive paste is composed of first and second conductive pastes in which particle sizes of the conductive metal are different from each other. A size of metal particles contained in an electrode connectivity contributing layer disposed in a central portion of the internal electrode pattern is greater than a size of metal particles contained in a withstand voltage improving layer disposed in an outer region thereof adjacent to the ceramic green sheet.

According to another aspect of the present disclosure, a multilayer ceramic electronic component may include a ceramic body including alternatively disposed dielectric layers and internal electrodes and external electrodes formed on an outer surface of the ceramic body and electrically connected to the internal electrodes. In a thickness direction of a respective one of the internal electrodes, an intermediate region of the respective internal electrode has a density of a ceramic additive greater than densities of ceramic additive contained in a boundary region and a center region of the respective internal electrode between which the intermediate region is interposed.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

An exemplary embodiment in the present disclosure relates to a ceramic electronic component, and an example of an electronic component using a ceramic material includes a capacitor, an inductor, a piezoelectric element, a varistor, a thermistor, or the like. Hereinafter, a multilayer ceramic capacitor will be described as an example of the ceramic electronic component.

Figure 1:
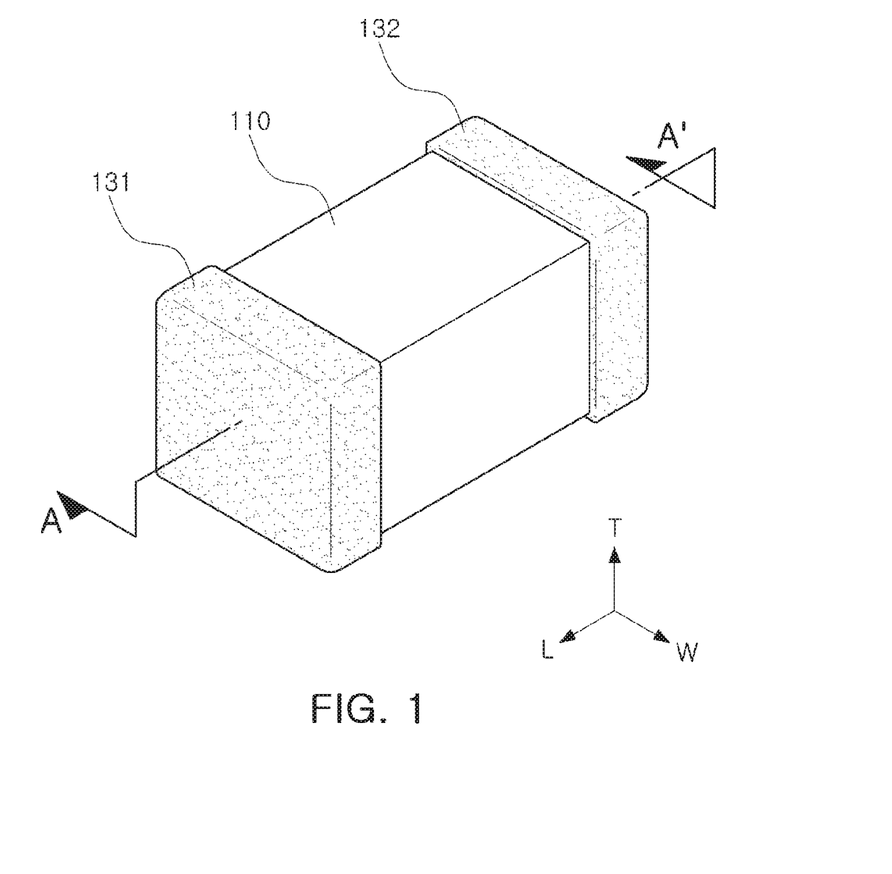
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
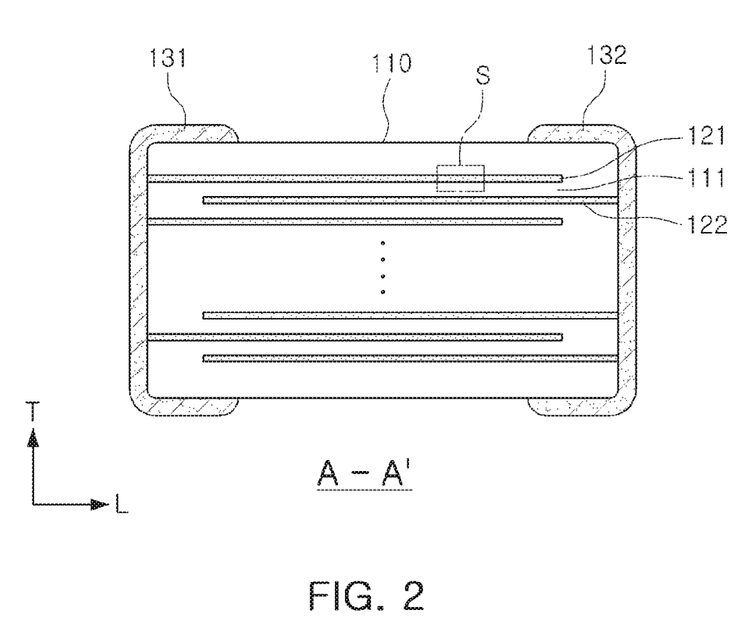
FIG. 2 is a schematic cross-sectional view illustrating the multilayer ceramic capacitor taken along line A-A' of FIG. 1.

FIG. 2 is a schematic cross-sectional view illustrating the multilayer ceramic capacitor taken along line A-A' of FIG. 1.

Referring to FIGS. 1 and 2, the multilayer ceramic capacitor according to the exemplary embodiment may include a ceramic body 110, internal electrodes 121 and 122 formed in the ceramic body, and external electrodes 131 and 132 formed on an outer portion of the ceramic body 110.

According to the exemplary embodiment, a "length" direction of the multilayer ceramic capacitor refers to an "L" direction of FIG. 1, a "width" direction thereof refers to a "W" direction of FIG. 1, and a "thickness" direction thereof refers to a "T" direction of FIG. 1. The "thickness direction" is the same as a direction in which dielectric layers are stacked, that is, the "stacking direction".

A shape of the ceramic body 110 is not particularly limited, but according to the exemplary embodiment, the ceramic body 110 may have a hexahedral shape.

The ceramic body 110 may be formed by stacking a plurality of dielectric layers 111.

The plurality of dielectric layers 111 configuring the ceramic body 110 may be in a sintered state, and adjacent dielectric layers may be integrated with each other so that boundaries therebetween are not readily apparent.

The dielectric layer 111 may be formed by sintering of a ceramic green sheet containing ceramic powder.

The ceramic powder is not particularly limited as long as it is generally used in the art.

Although not limited thereto, an example of the ceramic powder may include $BaTiO_3$-based ceramic powder.

Examples of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, or the like, is partially solid-dissolved in $BaTiO_3$, but are not limited thereto.

In addition, the ceramic green sheet may contain a transition metal, a rare earth element, Mg, Al, or the like, in addition to the ceramic powder.

A thickness of one dielectric layer 111 may be suitably changed according to a capacitance design of the multilayer ceramic capacitor.

Although not limited thereto, a thickness of a dielectric layer formed between two internal electrode layers adjacent to each other after sintering may be, for example, 0.6 μm or less.

In the exemplary embodiment, the thickness of the dielectric layer 111 may be defined as an average thickness.

The average thickness of the dielectric layer 111 may be measured from an image obtained by scanning a cross section of the ceramic body 110 in the length direction using a scanning electron microscope (SEM) as illustrated in FIG. 2.

For example, a thickness at thirty points that are equidistant from each other in the length direction may be measured, with respect to the dielectric layer randomly sampled from the image obtained by scanning a cross-section of the ceramic body 110 in a length-thickness (L-T) direction taken along a central portion of the ceramic body 110 in the width (W) direction using the scanning electron microscope (SEM), thereby measuring the average value, as illustrated in FIG. 2.

The thirty points each having the equidistance therebetween may be measured in a capacitance forming part that is defined as an area in which internal electrodes 121 and 122 overlap each other.

In addition, when an average thickness of ten or more dielectric layers 111 is measured by the above-mentioned method, the average thickness of the dielectric layer may be further generalized.

The internal electrodes 121 and 122 may be disposed in the ceramic body 110.

The internal electrodes 121 and 122 may be formed on the ceramic green sheet, stacked, and sintered to thereby be formed in the ceramic body 110 with each of the dielectric layers 111 interposed therebetween.

The internal electrodes may be composed of pairs of first and second internal electrodes 121 and 122 having different polarities from each other, and may be disposed to face each other in the stacking direction of the dielectric layers 111.

As illustrated in FIG. 2, distal ends of first and second internal electrodes 121 and 122 may be alternately exposed to surfaces of the ceramic body 110 in the length direction.

In addition, although not illustrated, according to the exemplary embodiment, the first and second internal electrodes may have lead portions and may be exposed to the same surface of the ceramic body through the lead portions. Alternatively, the first and second internal electrodes may have the lead portions and may be exposed to at least one surface of the ceramic body through the lead portions.

A thickness of one internal electrode 121 or 122 is not particularly limited, but, for example, may be 0.5 μm or less.

Alternatively, the thickness of one internal electrode 121 or 122 may be 0.1 μm to 0.5 μm. Alternatively, the thickness of one internal electrode 121 or 122 may be 0.3 μm to 0.5 μm.

According to the exemplary embodiment, 200 or more dielectric layers on each of which the internal electrode is formed may be stacked. A more detailed description thereof will be described below.

According to the exemplary embodiment, the external electrodes 131 and 132 may be formed on the outer portion of the ceramic body 110 and electrically connected to the internal electrodes 121 and 122.

More specifically, the external electrodes may be composed of a first external electrode 131 electrically connected to the first internal electrode 121 exposed to one surface of the ceramic body 110 and a second external electrode 132 electrically connected to the second internal electrode 122 exposed to the other surface thereof.

In addition, although not illustrated, a plurality of external electrodes may be formed in order to be connected to the first and second internal electrodes exposed to the ceramic body.

The external electrodes 131 and 132 may be formed of a conductive paste containing metal powder.

The metal powder contained in the conductive paste is not particularly limited. For example, Ni, Cu, or alloys thereof may be used.

A thickness of the external electrodes 131 and 132 may be appropriately determined depending on the use, or the like. For example, the thickness may be about 10 μm to 50 μm.

Figure 3:
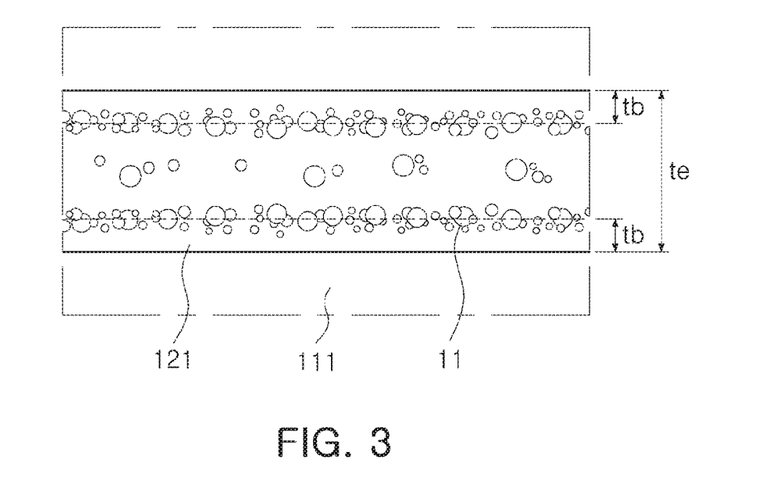
FIG. 3 is an enlarged view of part S of FIG. 2.

According to the exemplary embodiment, a ceramic additive 11 may be disposed in the internal electrode 121 or 122 at a position spaced apart from a boundary between the internal electrode 121 or 122 and the dielectric layer 111 by a predetermined distance.

In particular, the ceramic additive 11 may be linearly disposed in the internal electrode 121 or 122 at the position spaced apart from the boundary between the internal electrode 121 or 122 and the dielectric layer by the predetermined distance.

The ceramic additive 11 may be linearly disposed in the internal electrode 121 or 122 at the position spaced apart from the boundary between the internal electrode 121 or 122 and the dielectric layer by the predetermined distance by allowing an electrode connectivity contributing layer containing large-sized metal particles to be disposed in a central portion of the internal electrode pattern and allowing a withstanding voltage improving layer containing small-sized metal particles to be disposed in an outer region thereof adjacent to the ceramic green sheet during a manufacturing process of the multilayer ceramic capacitor.

As described above, the ceramic additive 11 may be linearly disposed in the internal electrode 121 or 122 at the position spaced apart from the boundary between the internal electrode 121 or 122 and the dielectric layer 111 by the predetermined distance, and thus a multilayer ceramic capacitor having excellent electrode connectivity after sintering and improved withstand voltage characteristics may be implemented.

In detail, since fine metal particles of which sintering shrinkage suppressing capability is small are sintered early and the large-sized metal particles in the central portion of the internal electrode pattern are sintered later during the sintering, the ceramic additive added together with the large-sized metal particles in the central portion is not squeezed-out toward the dielectric layer but is trapped therein, and thus the ceramic additive may be linearly disposed in an interface between the withstand voltage improving layer and the electrode connectivity contributing layer.

The position spaced apart from the boundary between the internal electrode 121 or 122 and the dielectric layer 111 by the predetermined distance in the internal electrode 121 or 122 may be the interface at which the electrode connectivity contributing layer containing the large-sized metal particles in the central portion of the internal electrode pattern and the withstand voltage improving layer containing the small-sized metal particles in the outer region thereof come in contact with each other.

In addition, the ceramic additive 11 is linearly disposed in the internal electrode 121 or 122 at the position spaced apart from the boundary between the internal electrode 121 or 122 and the dielectric layer 111 by the predetermined distance, which means that the ceramic additive 11 is disposed along the interface between the electrode connectivity contributing layer and the withstand voltage improving layer. In this case, the term "linearly disposed" does not mean that the ceramic additive is disposed in a form of a complete straight line, and includes a case in which the disposed ceramic additive looks like a line at first glance depending on a process variation.

According to the exemplary embodiment, when a thickness of the internal electrode is defined as te, and a distance from the boundary between the internal electrode and the dielectric layer to the position at which the ceramic additive is linearly disposed is defined as tb, tb/te satisfies $0.24 \leq tb/te \leq 0.33$.

The multilayer ceramic capacitor having excellent electrode connectivity and improved withstand voltage characteristics may be implemented by allowing tb/te to satisfy $0.24 \leq tb/te \leq 0.33$.

In a case in which tb/te is less than 0.24, the withstand voltage characteristics may be deteriorated, and in a case in which tb/te is more than 0.33, electrode connectivity may be deteriorated.

A density of the ceramic additive 11 disposed in the internal electrode at the position spaced apart from the boundary between the internal electrode 121 or 122 and the dielectric layer 111 by the predetermined distance may be higher than that in other regions. A density of a ceramic additive in one region means a degree of the ceramic additive filling in the one region.

Since the fine metal particles of which sintering shrinkage suppressing capability is small are sintered early and the large-sized metal particles in the central portion of the internal electrode pattern are sintered later during the sintering, the ceramic additive added together with the large-sized metal particles in the central portion is not squeezed-out toward the dielectric layer but is trapped therein, and thus the ceramic additive may be linearly disposed in the interface between the withstand voltage improving layer and the electrode connectivity contributing layer. Therefore, the density of the ceramic additive at this region may be higher than that in other regions.

According to the exemplary embodiment, as the ceramic additive 11 is adjusted to be linearly disposed in the internal electrode 121 or 122 at the position spaced apart from the boundary between the internal electrode 121 or 122 and the dielectric layer 111 by the predetermined distance, internal electrode connectivity may be 90% or more.

According to the exemplary embodiment, the internal electrode connectivity may be defined as a ratio of a length of a portion at which the internal electrode is actually formed to the entire length of the internal electrode (the length of the portion at which the internal electrode is actually formed/the entire length of the internal electrode).

The entire length of the internal electrode and the length of the portion at which the internal electrode is actually formed may be measured using an optical image obtained by scanning the cross-section of the multilayer ceramic capacitor as described above.

More specifically, the ratio of the length of the portion at which the internal electrode is actually formed to the entire length of the internal electrode may be measured from the image obtained by scanning the cross-section of the ceramic body in the length direction, taken along the central portion of the ceramic body in the width direction.

In the exemplary embodiment, the entire length of the internal electrode may mean a length of one internal electrode including a gap formed therein, and the length of the portion at which the internal electrode is actually formed may mean a length of one internal electrode except for the gap formed therein. As described above, the gap is defined as a pore penetrating through the internal electrode, and does not include a pore formed only a portion of a surface of the internal electrode or formed in the internal electrode.

According to the exemplary embodiment, an actual length of the internal electrode may be measured as a value obtained by subtracting lengths of gaps from the entire length of the internal electrode.

According to the exemplary embodiment, the thickness of one internal electrode 121 or 122 may be 0.5 μm or less.

Alternatively, the thickness of one internal electrode 121 or 122 may be 0.1 μm to 0.5 μm. Alternatively, the thickness of one internal electrode 121 or 122 may be 0.3 μm to 0.5 μm.

Figure 4:
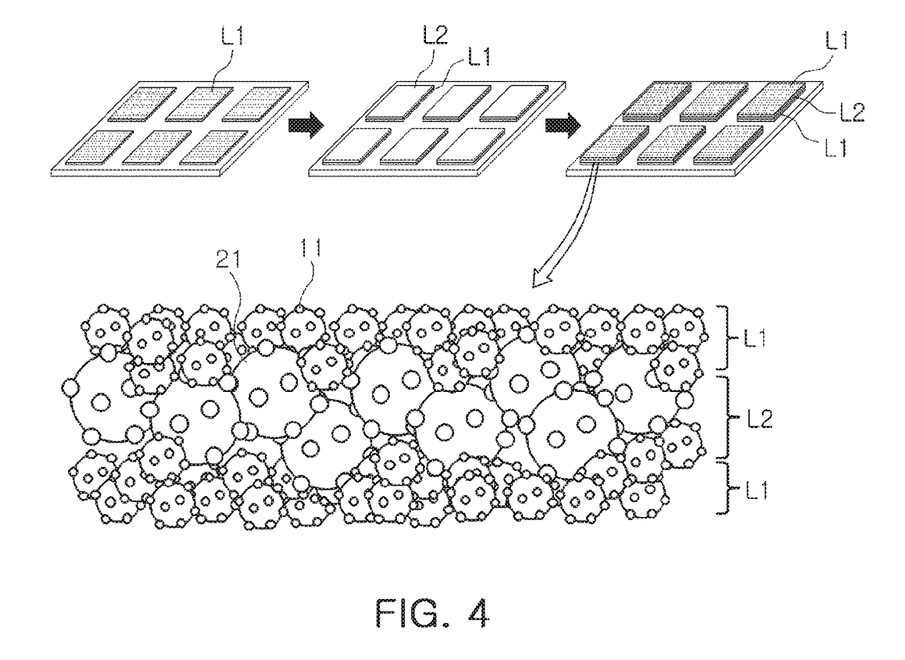
FIG. 4 is a schematic view illustrating formation an internal electrode pattern on a ceramic green sheet in a method of manufacturing a multilayer ceramic capacitor according to another exemplary embodiment in the present disclosure.

FIG. 4 is a schematic view illustrating formation of an internal electrode pattern on a ceramic green sheet in a method of manufacturing a multilayer ceramic capacitor according to another exemplary embodiment in the present disclosure.

According to another exemplary embodiment, there is provided a method of manufacturing a multilayer ceramic electronic component including: preparing a ceramic green sheet, forming, on the ceramic green sheet, an internal electrode pattern using a conductive paste containing a conductive metal and a ceramic additive, stacking additional ceramic green sheets on each of which an additional internal electrode pattern is formed to forma ceramic multilayer body, and sintering the ceramic multilayer body to form a ceramic body including dielectric layers and internal electrodes. The conductive paste is composed of first and second conductive pastes in which particle sizes of the conductive metal are different from each other, an electrode connectivity contributing layer containing large-sized metal particles is disposed in a central portion of the internal electrode pattern, and a withstand voltage improving layer containing small-sized metal particles is disposed in an outer region thereof adjacent to the ceramic green sheet.

Hereinafter, a method of manufacturing a multilayer ceramic capacitor according to another exemplary embodiment will be described below.

According to the exemplary embodiment, a plurality of ceramic green sheets may be prepared. The ceramic green sheet may be manufactured in a sheet form having a thickness of several μm by mixing the ceramic powder, a binder, a solvent, and the like, to prepare slurry, and applying the slurry using by a doctor blade method. Thereafter, the ceramic green sheet may be sintered to form a dielectric layer 111 as illustrated in FIG. 2.

Next, the internal electrode pattern may be formed by applying a conductive paste for an internal electrode onto the ceramic green sheet. The internal electrode pattern may be formed by a screen printing method or a gravure printing method.

Referring to FIG. 4, the conductive paste may be composed of the first and second conductive pastes in which particle sizes of the conductive metal 21 are different from each other, an electrode connectivity contributing layer L2 containing the large-sized metal particles is disposed in the central portion of the internal electrode pattern, and a withstand voltage improving layer L1 containing the small-sized metal particles is disposed in the outer region thereof adjacent to the ceramic green sheet.

Two or more conductive metal particles may be disposed in the withstand voltage improving layer L1 in a stacking direction of the internal electrode pattern.

When a thickness of the internal electrode pattern is defined as te, and a thickness of the withstand voltage improving layer L1 is defined as ta, ta/te may satisfy $0.24 \leq ta/te \leq 0.33$.

The multilayer ceramic capacitor having excellent electrode connectivity and improved withstand voltage characteristics may be implemented by allowing ta/te to satisfy $0.24 \leq tb/te \leq 0.33$.

In a case in which ta/te is less than 0.24, the withstand voltage characteristics may be deteriorated, and in a case in which ta/te is more than 0.33, electrode connectivity may be deteriorated.

Referring to FIG. 4, a structure according to the present disclosure may be implemented by applying the conductive paste containing the small-sized metal particles on the ceramic green sheet to form the withstand voltage improving layer L1, applying the conductive paste containing large-sized metal particles thereon to form the electrode connectivity contributing layer L2, and applying the conductive paste containing the small-sized metal particles thereon to form another withstand voltage improving layer L1.

However, the multilayer structure as described above is not limited thereto, and may be variously changed. In addition, although a case in which the conductive paste is applied several times is described herein, the method for implementing the structure is not limited thereto, and the structure may be implemented by a printing method, or the like.

Then, the ceramic green sheets, on each of which the internal electrode pattern is formed, may be stacked, pressed in the stacking direction, and compressed. Therefore, the ceramic multilayer body in which the internal electrode pattern is formed may be manufactured.

Next, the ceramic multilayer body may be cut per a region corresponding to one capacitor to thereby be formed in a chip form.

At this time, the ceramic multilayer body may be cut so that one ends of the internal electrode patterns are alternately exposed to a side surface of the cut ceramic multilayer body.

Next, the ceramic body may be manufactured by sintering the multilayer body in the chip form.

As described above, the sintering may be performed under a reducing atmosphere.

In addition, the sintering may be performed while adjusting a heating rate, and the heating rate may be 30° C./60 s to 50° C./60 s at a temperature of 700° C. or less, but is not limited thereto.

Thereafter, the external electrodes may be formed to be electrically connected to the internal electrodes exposed to a side surface of the ceramic body while covering the side surface of the ceramic body. Thereafter, plating layers formed of nickel, tin, or the like, may be formed on surfaces of the external electrodes.

Therefore, the internal electrode connectivity may become excellent, and high capacitance may be implemented.

As illustrated in the following Table 1, electrode connectivity, an effect of decreasing a thickness of an internal electrode, capacitance, and withstand voltage characteristics depending on a ratio (ta/te) of a thickness to of a withstand voltage improving layer L1 to a thickness te of an internal electrode pattern te were evaluated, and the results were compared.

TABLE 1

| Ratio (ta/te) of thickness (ta) of withstand voltage improving layer L1 to thickness (te) of internal electrode pattern | Electrode Connectivity | Withstand Voltage Characteristics Evaluation |
| --- | --- | --- |
| 1* | 0.12 | ◎ | X |
| 2* | 0.15 | ◎ | X |
| 3* | 0.18 | ◎ | X |
| 4* | 0.21 | ◎ | X |
| 5 | 0.24 | ◎ | ○ |

TABLE 1-continued

| Ratio (ta/te) of thickness (ta) of withstand voltage improving layer L1 to thickness (te) of internal electrode pattern | Electrode Connectivity | Withstand Voltage Characteristics Evaluation |
| --- | --- | --- |
| 6 | 0.27 | ○ | ○ |
| 7 | 0.3 | ○ | ○ |
| 8 | 0.33 | ○ | ◎ |
| 9* | 0.36 | X | ◎ |
| 10* | 0.4 | X | ◎ |

[Evaluation]
X: Poor (75% or less), ○: Good (75~80%), ◎: Excellent (85% or more)
*: Comparative Example Referring to Table 1, it may be appreciated that in samples 1 to 4 in which the ratio of the thickness of the withstand voltage improving layer L1 to the thickness of the internal electrode pattern was less than 0.24, there was a problem in withstand voltage characteristics, and in samples 9 and 10 in which the ratio of the thickness of the withstand voltage improving layer L1 to the thickness of the internal electrode pattern was more than 0.33, there was a problem in electrode connectivity.

On the contrary, it may be appreciated that in samples 5 to 8 in which the numerical range of the present disclosure was satisfied, a high-capacitance multilayer ceramic capacitor having internal electrode connectivity of 90% or more and excellent withstand voltage characteristics may be implemented.

As set forth above, according to exemplary embodiments in the present disclosure, the multilayer ceramic capacitor having excellent electrode connectivity after sintering and improved withstand voltage characteristics may be implemented by applying the internal electrode pattern so that the electrode connectivity contributing layer capable of suppressing sintering shrinkage is disposed between the withstand voltage improving layers capable of securing withstand voltage characteristics.

In detail, the internal electrode pattern may have a structure in which the electrode connectivity contributing layer containing the large-sized metal particles is disposed in the central portion thereof and the withstand voltage improving layer containing the small-sized metal particles is disposed in the outer region thereof adjacent to the ceramic green sheet, and thus the internal electrodes having excellent electrode connectivity after sintering and a reduced thickness may be formed.

Further, since the fine metal particles of which sintering shrinkage suppressing capability is small are sintered early and the large-sized metal particles in the central portion of the internal electrode pattern are sintered later during the sintering, the ceramic additive added together with the large-sized metal particles in the central portion is not squeezed-out toward the dielectric layer but is trapped therein, and thus the ceramic additive may be disposed in the interface between the withstand voltage improving layer and the electrode connectivity contributing layer. Therefore, electrode connectivity may not be deteriorated, and thus the multilayer ceramic electronic component may have high capacitance, and electrode aggregation does not occur, and as a result the multilayer ceramic electronic component having excellent withstand voltage characteristics may be implemented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers, and internal electrodes alternately disposed on the dielectric layers and containing a ceramic additive disposed therein; and
external electrodes formed on an outer portion of the ceramic body and electrically connected to the internal electrodes,
wherein the ceramic additive is disposed in the internal electrode at a position spaced apart from a boundary between the internal electrode and the dielectric layer by a predetermined distance,
wherein the ceramic additive is linearly disposed in the internal electrode at the position spaced apart from the boundary between the internal electrode and the dielectric layer by the predetermined distance, and
$0.24 \leq tb/te \leq 0.33$ is satisfied, in which to is a thickness of the internal electrode, and tb is a distance from the boundary between the internal electrode and the dielectric layer to the position at which the ceramic additive is linearly disposed.

2. The multilayer ceramic electronic component of claim 1, wherein a density of the ceramic additive disposed in the internal electrode at the position spaced apart from the boundary between the internal electrode and the dielectric layer by the predetermined distance is higher than that in other regions.

3. The multilayer ceramic electronic component of claim 1, wherein internal electrode connectivity defined as a ratio of an actual length of the internal electrode to an entire length of the internal electrode is 90% or more.

4. The multilayer ceramic electronic component of claim 1, wherein an average size of metal particles at a central region of the internal electrode is greater than that of metal particles in boundary regions of the internal electrode between which the central region thereof is disposed.

5. A method of manufacturing a multilayer ceramic electronic component, the method comprising:
preparing a ceramic green sheet;
forming, on the ceramic green sheet, an internal electrode pattern using a conductive paste containing a conductive metal and a ceramic additive;
stacking additional ceramic green sheets on each of which an additional internal electrode pattern is formed to form a ceramic multilayer body; and
sintering the ceramic multilayer body to form a ceramic body including dielectric layers and internal electrodes,
wherein the conductive paste is composed of first and second conductive pastes in which particle sizes of the conductive metal are different from each other, and a size of metal particles contained in an electrode connectivity contributing layer disposed in a central portion of the internal electrode pattern is greater than that of metal particles contained in a withstand voltage improving layer disposed in an outer region thereof adjacent to the ceramic green sheet.

6. The method of claim 5, wherein two or more conductive metal particles are disposed in the withstand voltage improving layer in a stacking direction of the ceramic green sheets.

7. The method of claim 5, wherein $0.24 \leq ta/te \leq 0.33$ is satisfied, in which to is a thickness of the internal electrode pattern, and to is a thickness of the withstand voltage improving layer.

8. The method of claim 5, wherein the ceramic additive is disposed in the internal electrode at a position spaced apart from a boundary between the internal electrode and the dielectric layer by a predetermined distance.

9. The method of claim 8, wherein the ceramic additive is linearly disposed in the internal electrode at the position spaced apart from the boundary between the internal electrode and the dielectric layer by the predetermined distance.

10. The method of claim 5, wherein internal electrode connectivity defined as a ratio of an actual length of the internal electrode to an entire length of the internal electrode is 90% or more.

11. A multilayer ceramic electronic component comprising:
a ceramic body including alternatively disposed dielectric layers and internal electrodes; and
external electrodes formed on an outer surface of the ceramic body and electrically connected to the internal electrodes,
wherein in a thickness direction of a respective one of the internal electrodes, an intermediate region of the respective internal electrode has a density of a ceramic additive greater than densities of ceramic additive contained in a boundary region and a center region of the respective internal electrode between which the intermediate region is interposed.

12. The multilayer ceramic electronic component of claim 11, wherein the intermediate region linearly extends along a length direction of the ceramic body.

13. The multilayer ceramic electronic component of claim 11, wherein internal electrode connectivity defined as a ratio of an actual length of the respective internal electrode to an entire length of the respective internal electrode is 90% or more.

14. The multilayer ceramic electronic component of claim 11, wherein an average size of metal particles in the central region of the respective internal electrode is greater than that of metal particles in the boundary region of the respective internal electrode.

* * * * *